June 10, 1952 — H. T. LAMB — 2,600,117
MIXING OR KNEADING MACHINE
Filed May 2, 1950
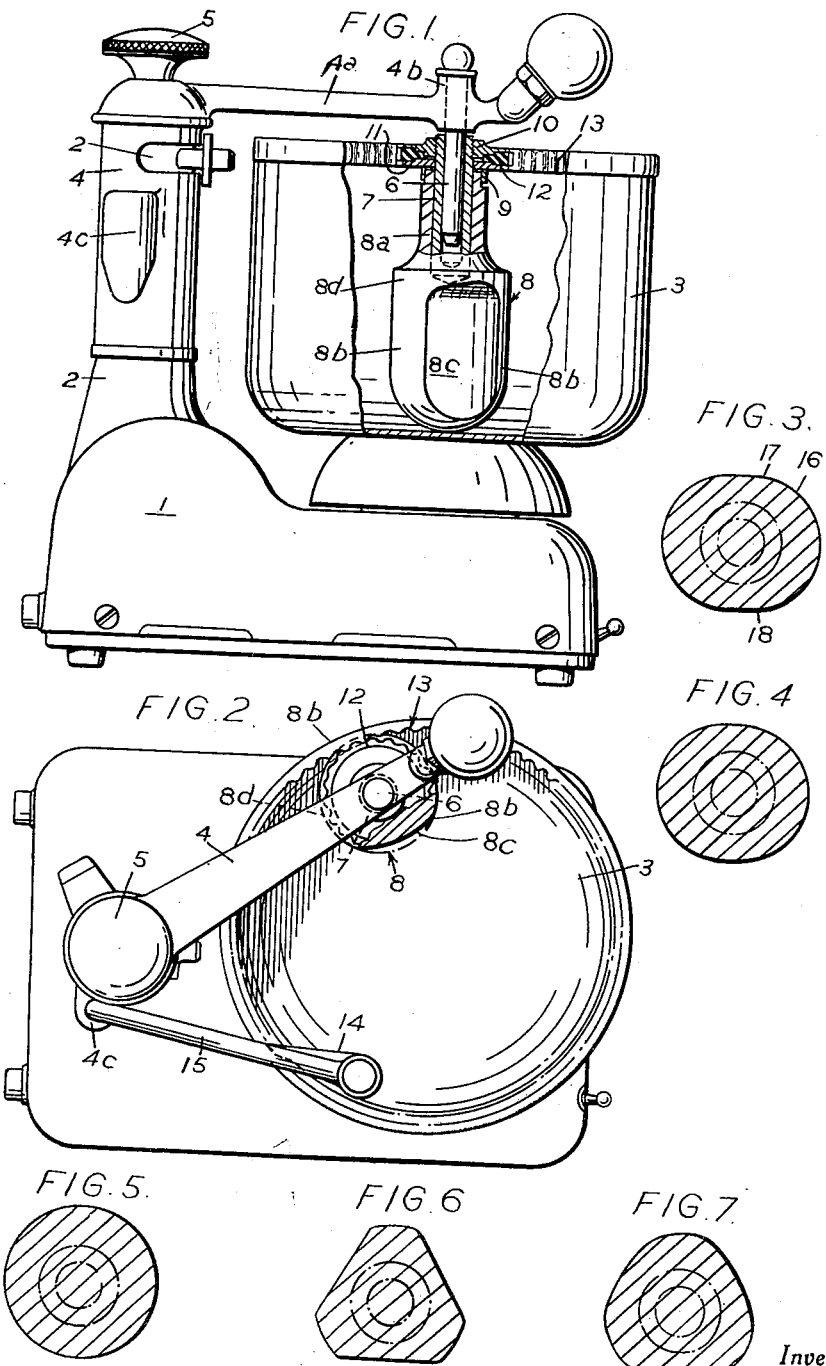

Patented June 10, 1952

2,600,117

UNITED STATES PATENT OFFICE 2,600,117

MIXING OR KNEADING MACHINE

Harold Thomas Lamb, Newcastle-on-Tyne, England

Application May 2, 1950, Serial No. 159,417
In Great Britain May 12, 1949

3 Claims. (Cl. 259—85)

This invention relates to mixing or kneading machines, and particularly to machines for producing mixtures of edible materials for culinary purposes such, for example, as flour, meal, fat, egg, milk, fruit and/or vegetables, such machines being of the kind comprising an electrically driven revolving bowl or vessel and a depending dolly having a kneading portion which coacts with the internal periphery of the bowl to effect the kneading or mixing and is driven by a rim on the bowl.

In use, it is found that butter or other fat and similar compact materials tend to adhere to the dolly and prevent its rotation, thereby hindering the mixing process, and the object of the present invention is to provide a mixing machine with an improved dolly whereby the kneading or mixing process will be facilitated.

According to the invention the surface of the kneading portion of the dolly is of cam form so that the mixture is periodically flattened between the dolly and the bowl at least once between each dolly rotation.

According to one form, the kneading surface of the dolly is of cylindrical or similar shape, the axis of which is eccentric to the axis about which the dolly revolves.

According to another form the cross-section of the kneading portion of the dolly is of symmetrical cam form with two or more rises, the rises being connected by plane or convex surfaces. This gives a more efficient kneading and mixing effect with the absence of vibration on the dolly.

With the symmetrical form of dolly, two or more beating actions are effected during one revolution of the dolly with resulting more rapid mixing, and, owing to the symmetrical form, this is carried out without vibration on the dolly.

Preferably in all the above forms the kneading portion of the dolly has a short cylindrical portion which is coaxial with the axis of rotation of the dolly, with a view to maintaining the said axis at a constant distance from the bowl and thus a constant driving engagement between the dolly and the bowl. The cylindrical portion is preferably at the upper end of the coacting portion of the dolly.

The invention will now be described by way of example with reference to the accompanying drawings.

In the said drawings:

Fig. 1 is an elevation of a mixing machine, with a portion of the bowl broken away, provided with a dolly of double cam form.

Fig. 2 is a plan of Fig. 1.

Fig. 3 is a section of an eccentric dolly.

Figs. 4 to 7 are cross sections of different shapes of dollies.

Referring more particularly to the drawings the mixing machine has an electric motor (not shown) housed within a hollow rectangular base 1 having an upstanding rear column 2. A cylindrical bowl 3 is adapted to engage the upper end of a vertical spindle (not shown) driven by the motor so that the bowl is rotated by the latter. A vertical sleeve 4 carrying a headed horizontal arm 4a is pivotally mounted about the rear column 2, and adapted to be resiliently pressed towards the inner wall of the bowl 3 and a clamping screw 5 serves for locking the sleeve and arm after angular adjustment thereof.

The arm 4a has formed at its free end a boss 4b from which depends a vertical pin 6 on which is slidably mounted the dolly assembly. The dolly assembly comprises a non-ferrous sleeve 7 slidable on the pin 6, the said sleeve being a driving fit in a bore formed in a dolly proper 8 which is of hardwood.

When in its operative position the dolly 8 rests on the bottom of the bowl, its lower end being shaped to fit into the radius thereof. The dolly 8 has a reduced neck portion 8a at its upper portion and the upper end of this portion has fitted over it a ferrule 9. The upper end of the sleeve 7 is threaded to engage one of a pair of stepped discs 10, 11 the lower of which passes over the plain portion of the sleeve 7. The two discs between them hold rigidly a toothed annulus 12 of synthetic or vulcanised rubber or the equivalent to form a pinion which meshes with a corresponding internally toothed non-ferrous annulus 13 fitted in an internal peripheral groove in the upper portion of the bowl 3.

The lower or kneading portion of the dolly 8 is of a double symmetrical cam shape having two rises 8b whose surfaces are coaxial with the dolly axis, the larger surfaces 8c being segmental in cross section. At the upper end there is a narrow cylindrical portion 8d which maintains the dolly axis at a constant distance from the side of the bowl so that the two annuli 12 and 13 are in constant mesh.

The dolly is fitted to the machine merely by sliding it up the pin 6 and allowing it to rest on the bottom of the bowl.

A scraper 14 is suspended from a second horizontal arm 15 pivoted in a bearing 4c at one side of the sleeve 4, the said scraper bearing against the internal periphery of the bowl 3. For convenience the scraper assembly is omitted in Fig. 1.

In use, the dolly pinion 12 is engaged with the toothed rim of the bowl 3 and the materials to be mixed are placed therein. On the bowl 3 being rotated by the motor, the dolly 8 is also rotated in the same direction, and its cam-like kneading portion functions to feed and squeeze the materials against the wall of the bowl 3. Lumps of butter, fat and similar compact material coming against the dolly 8 are pressed thereby against the wall of the bowl 3 and as the wider portions of the dolly come into contact with the lumps, the latter are subjected to repeated impacts which cause them to be more effectively broken down or flattened than occurs with a simple rolling action. As the bowl and the dolly simultaneously revolve, the lumps are continuously flattened out and urged onwards between the dolly and the bowl wall without bringing the dolly to a standstill, thereby facilitating the mixing process. The double cam formation gives two such impact flattening effects for each dolly rotation and so accelerates the mixing process. Being of curved shape, the dolly is readily cleaned after use.

Fig. 3 shows another form of dolly section somewhat similar to that shown in Figs. 1 and 2 but comprising two diametrically opposite eccentrics 16 whose axes are in diametrical alignment with the axis of the dolly, while the eccentrics have their faces joined by straight lines 17, the resulting shape being a flat sided oval.

According to other forms the cam shape may be elliptical as shown in Fig. 4, or eccentric as shown in Fig. 5.

In a still further form the cam shape may be triangular with rounded corners, with either flat sides as shown in Fig. 6 or convex sides as shown in Fig. 7. This form gives three flattening operations for dolly rotation and so further accelerates mixing.

Instead of using a toothed engagement between the dolly and the bowl a friction engagement may be used according to known practice.

I claim:

1. A mixing or kneading machine of the kind referred to comprising a mixing bowl, means for rotating the bowl, and a vertical rotary dolly driven by said bowl, said dolly having its lower end shaped to the outline of the bowl section, wherein the kneading portion of the dolly has its horizontal section of symmetrical cam form with a plurality of rises so that the mixture is flattened between the dolly and the side of the bowl during the rotation of the bowl and at least twice during each dolly rotation; the kneading portion of the dolly having a short cylindrical portion which is coaxial with the axis of rotation of the dolly for the purpose set forth.

2. A mixing or kneading machine of the kind referred to comprising a mixing bowl, means for rotating the bowl, and a vertical rotary dolly driven by said bowl, said dolly having its lower end shaped to the outline of the bowl section, wherein the kneading portion of the dolly has its horizontal section of symmetrical cam form with a plurality of rises so that the mixture is flattened between the dolly and the side of the bowl during the rotation of the bowl and at least twice during each dolly rotation; the upper end of the kneading portion of the dolly having a short cylindrical portion which is coaxial with the axis of rotation of the dolly for the purpose set forth.

3. An article of manufacture for use in a mixing or kneading machine of the kind having a rotary bowl, a bowl, means for rotating the bowl, a rotary dolly cooperating with the side and resting on the bottom of the bowl, the kneading portion of which dolly is of symmetrical cam form with a plurality of rises so that the mixture is flattened between the dolly and the side of the bowl at least twice during each dolly rotation, the kneading portion of the dolly having a short cylindrical portion which is coaxial with the axis of rotation of the dolly for the purpose set forth.

HAROLD THOMAS LAMB.

REFERENCES CITED

The following references are of record in the file of this patent:

UNITED STATES PATENTS

| Number | Name | Date |
|---|---|---|
| 1,366,646 | Glaze | Jan. 25, 1921 |
| 1,530,020 | Tiedke | Mar. 17, 1925 |
| 2,270,164 | Du Reitz et al. | Jan. 13, 1942 |

FOREIGN PATENTS

| Number | Country | Date |
|---|---|---|
| 26,798 | France | Mar. 15, 1924 |